(12) United States Patent
Vitoorapakorn

(10) Patent No.: US 6,203,090 B1
(45) Date of Patent: Mar. 20, 2001

(54) PLASTIC BED LINER RETAINER FOR A PICKUP TRUCK

(75) Inventor: Pawat Vitoorapakorn, Samut Prakarn (TH)

(73) Assignee: Eastern Polymer Industry Co., Ltd., Samut Prakarn (TH)

( * ) Notice: Subject to any disclaimer, the term of this patent is extended or adjusted under 35 U.S.C. 154(b) by 0 days.

(21) Appl. No.: 09/250,656

(22) Filed: Feb. 16, 1999

(30) Foreign Application Priority Data

Aug. 13, 1998 (TH) .................................................. 045552

(51) Int. Cl.[7] .............................. B60R 13/01; B62D 33/02
(52) U.S. Cl. ........................ 296/39.2; 410/101; 410/106
(58) Field of Search .............................. 296/39.1, 39.2; 410/101, 102, 106, 110

(56) References Cited

U.S. PATENT DOCUMENTS

| Re. 36,073 | * | 2/1999 | Kremer et al. | 296/39.2 |
|---|---|---|---|---|
| 4,659,133 | * | 4/1987 | Gower | 296/39.2 |
| 4,740,026 | * | 4/1988 | Wagner | 296/39.2 |
| 4,796,942 | * | 1/1989 | Robinsone et al. | 296/39.2 |
| 4,850,633 | * | 7/1989 | Emery | 296/39.2 |
| 4,906,040 | * | 3/1990 | Edwards | 296/39.2 |
| 5,046,775 | * | 9/1991 | Marcum, Jr. et al. | 296/39.2 |
| 5,100,193 | * | 3/1992 | Oprea et al. | 296/39.2 |
| 5,364,150 | * | 11/1994 | Cochran et al. | 296/39.2 |
| 5,372,397 | * | 12/1994 | Ardnt | 296/39.2 |
| 5,738,471 | * | 4/1998 | Zentner et al. | 410/110 |
| B1 5,046,775 | * | 12/1993 | Marcum, Jr. et al. | |

FOREIGN PATENT DOCUMENTS

091083852 * 1/1992 (AU) .

* cited by examiner

Primary Examiner—D. Glenn Dayoan
Assistant Examiner—Patricia Engle
(74) Attorney, Agent, or Firm—Akin, Gump, Strauss, Hauer & Feld, L.L.P.

(57) ABSTRACT

A retainer apparatus for securing a bed liner to a pickup truck bed having either an inwardly or outwardly extending top bed rail. The pickup truck bed has a plurality of bed holes and the bed liner has a plurality of liner holes. The retainer apparatus includes a front tie-down ring retaining plate for positioning between the pickup truck bed and the bed liner. The front tie-down ring retaining plate has a first end and an opposing second end. The first end has at least one hole therethrough for alignment with one of the bed holes. The first end is secured to one of the bed holes. The second end has at least one hole therethrough for alignment with one of the holes in the bed liner. The second end secured is to the one of the holes in the bed liner. The apparatus also includes a rear tie-down ring retaining plate for positioning between the pickup truck bed and the bed liner. The front tie-down ring retaining plate has a first end and an opposing second end. The first end has at least one hole therethrough for alignment with one of the bed holes. The first end is secured to the one of the bed holes. The second end has at least one hole therethrough for alignment with one of the holes in the bed liner. The second end is secured to the one of the holes in the bed liner.

7 Claims, 16 Drawing Sheets

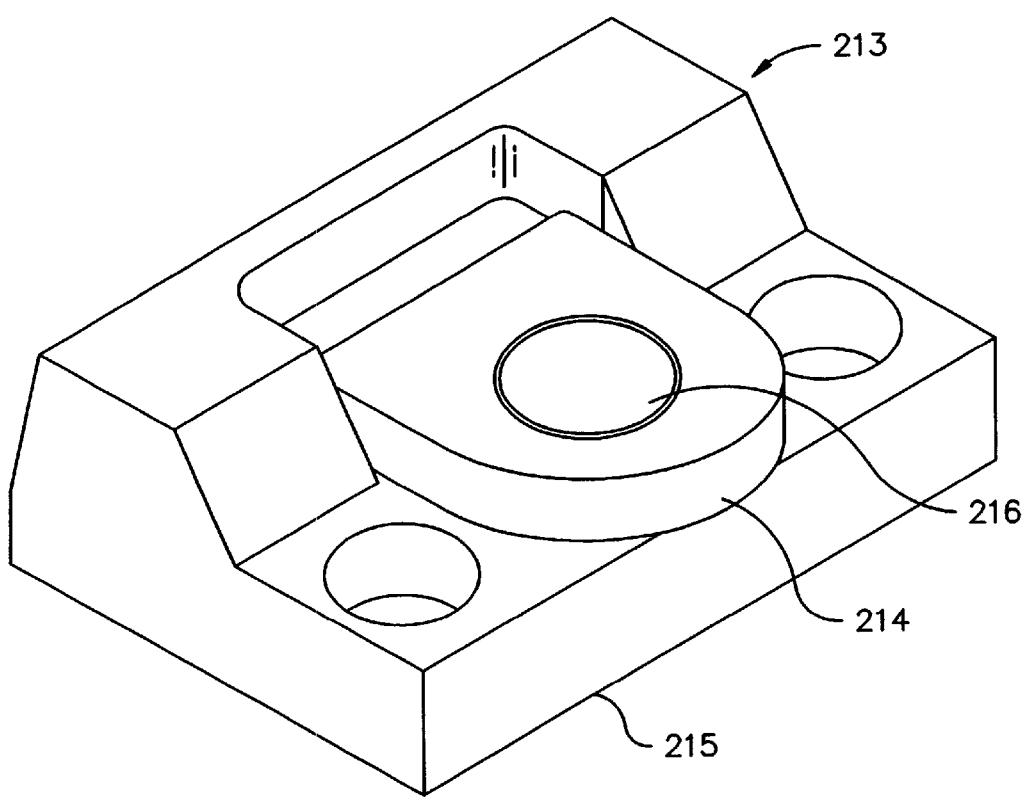
Fig. 4.1

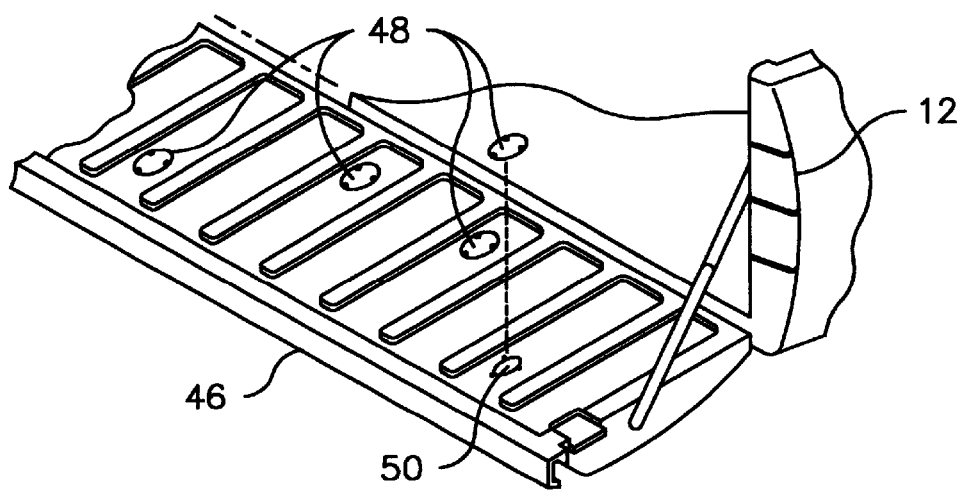
*Fig. 5*
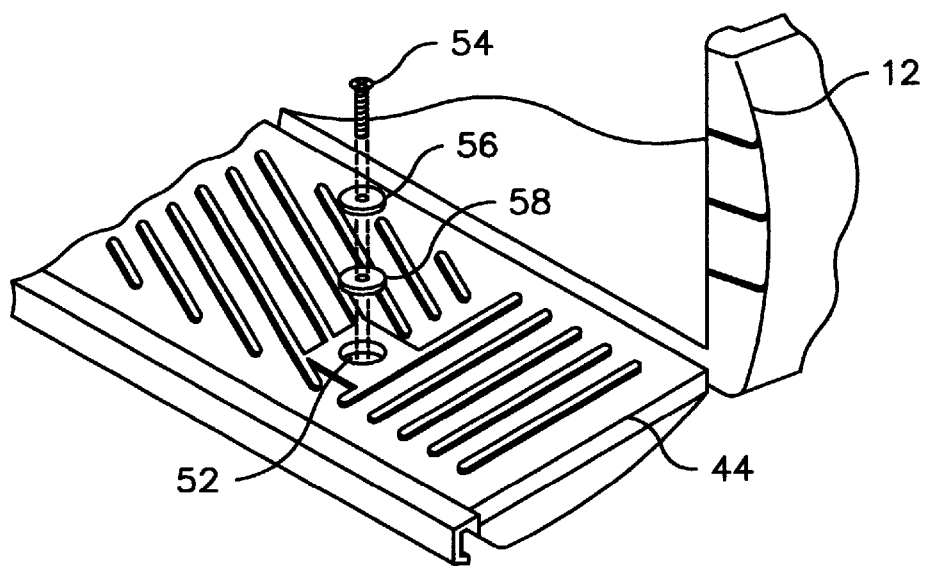
*Fig. 5.1*

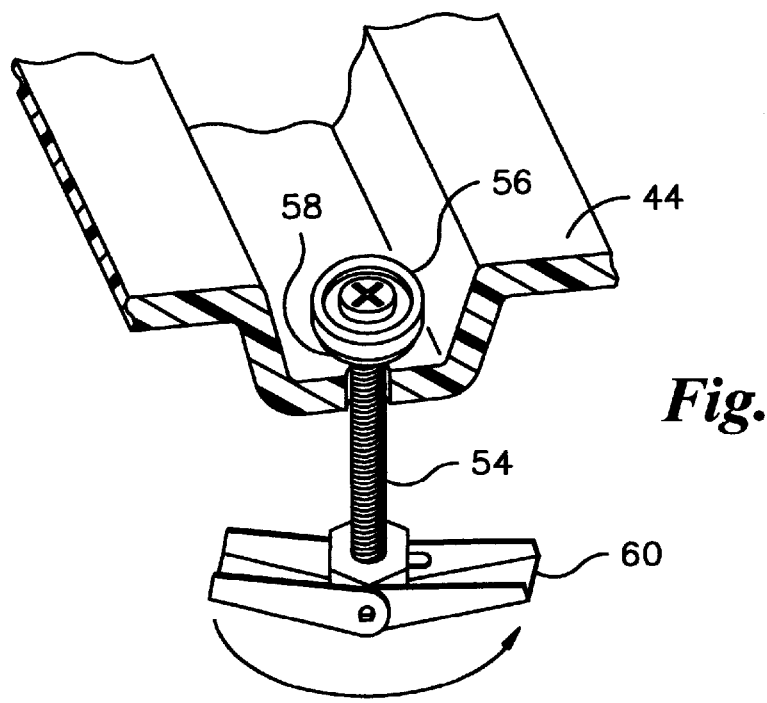
Fig. 6
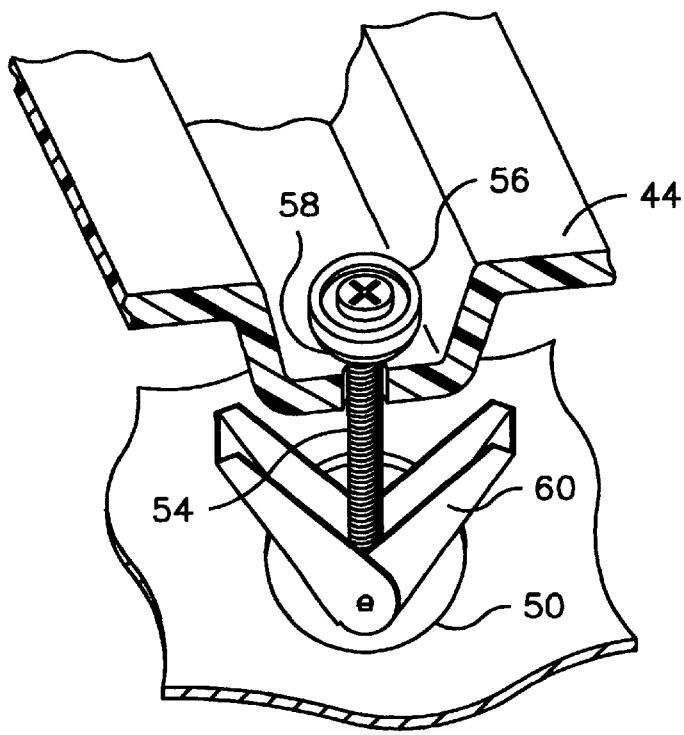
Fig. 6.1

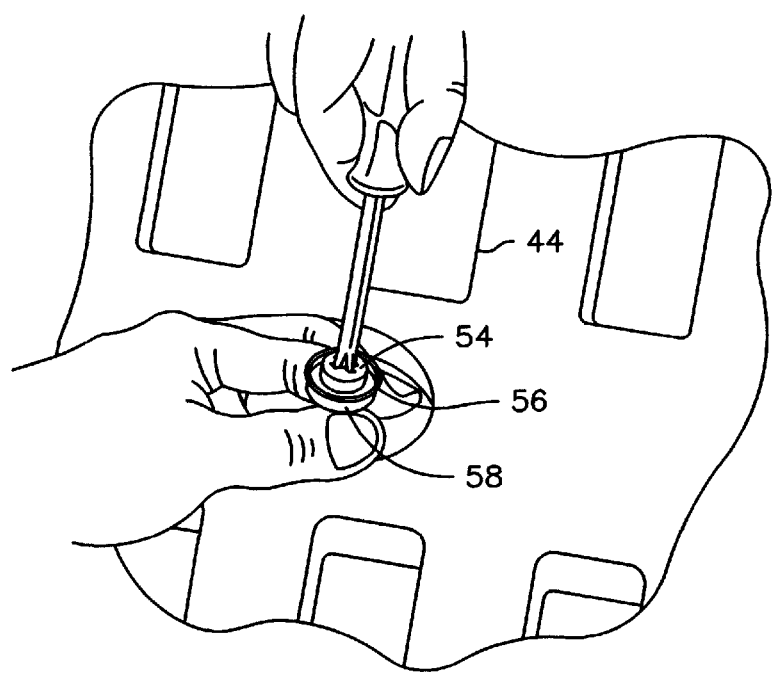
*Fig. 7*
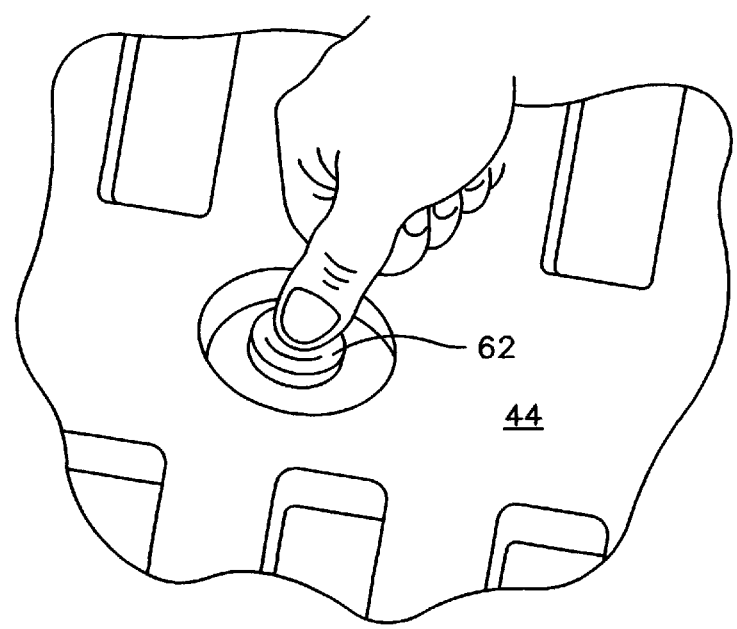
*Fig. 7.1*

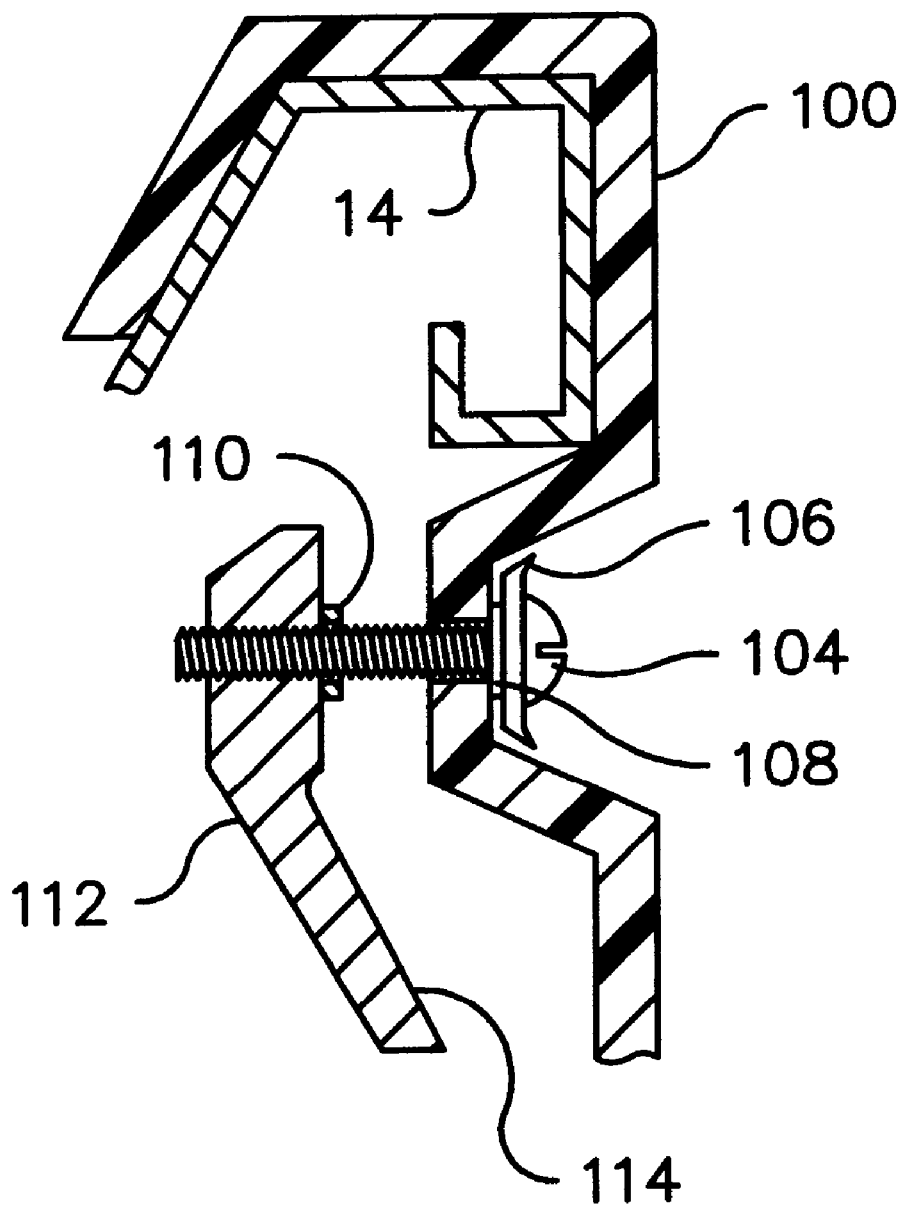
*Fig. 8.1*

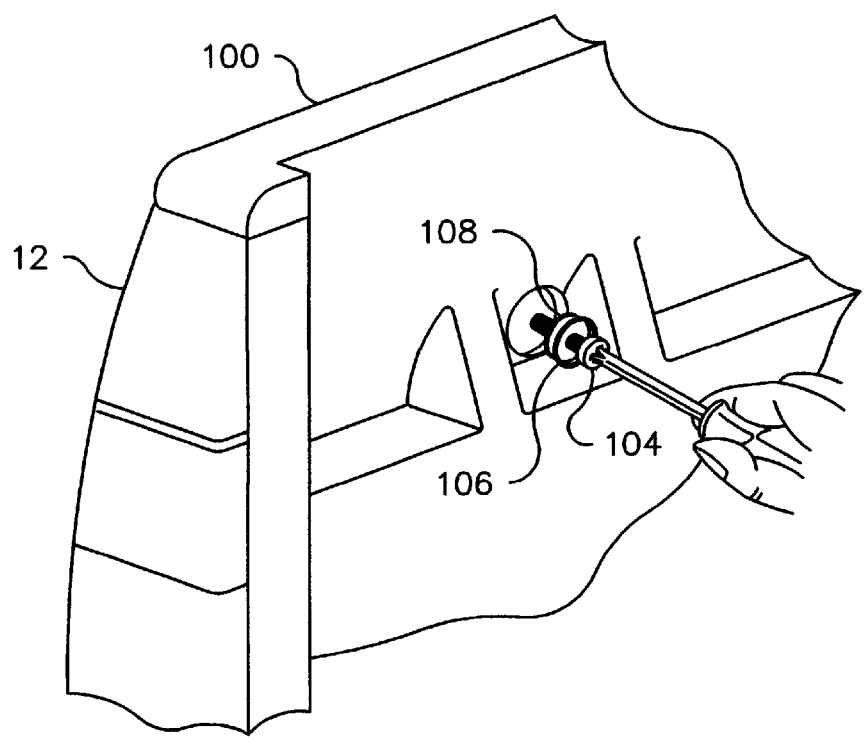
*Fig. 9*
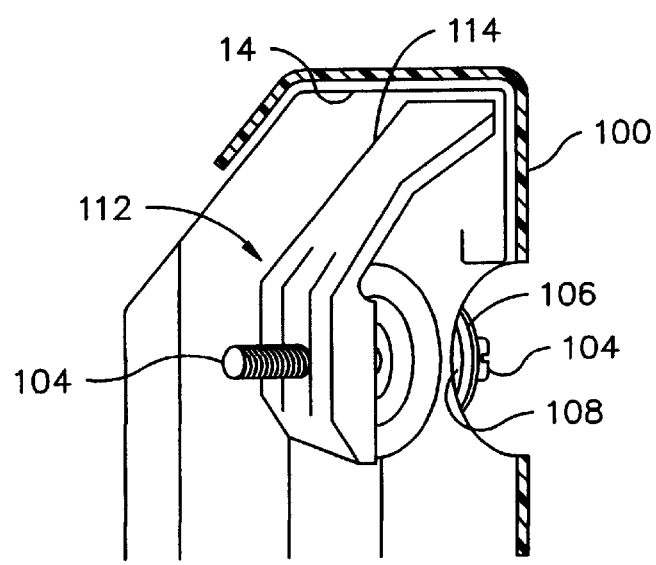
*Fig. 9.1*

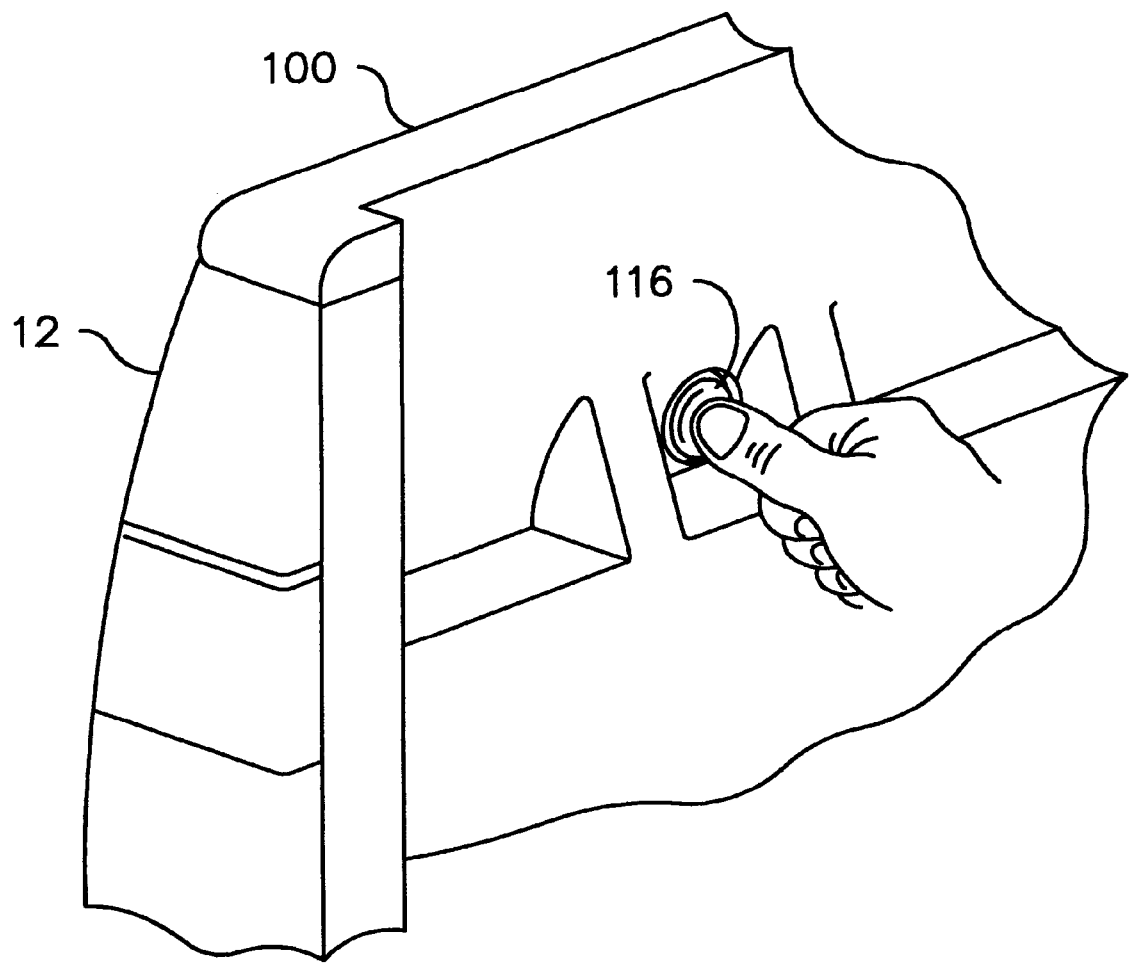
*Fig. 9.2*

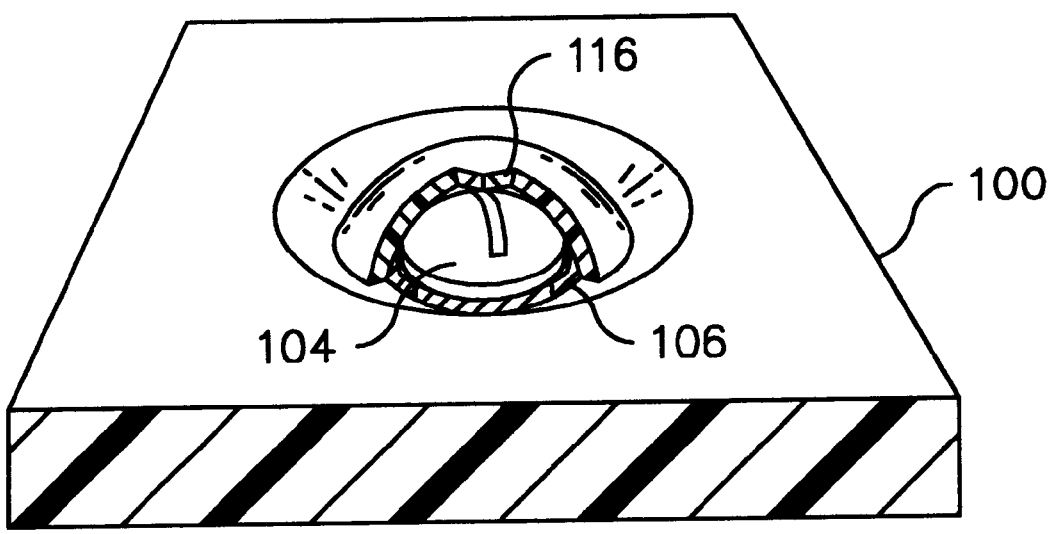
*Fig. 9.3*

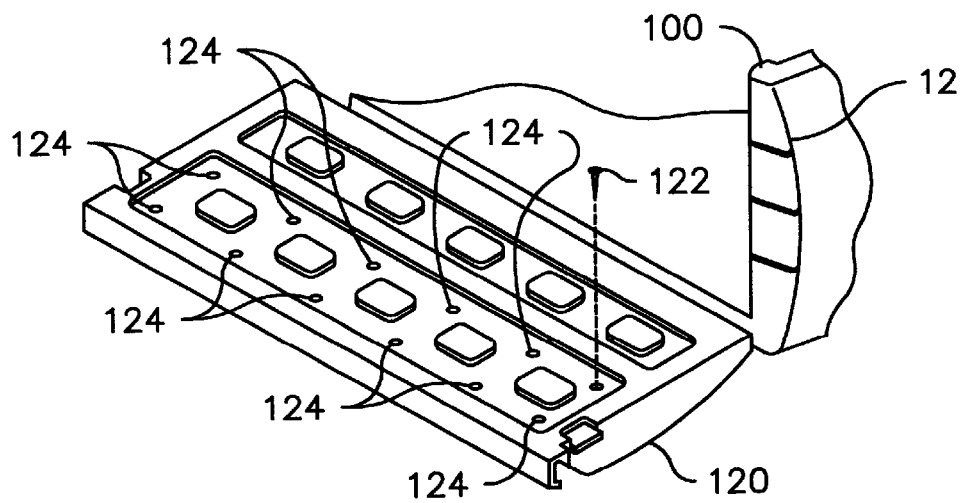
*Fig. 10*
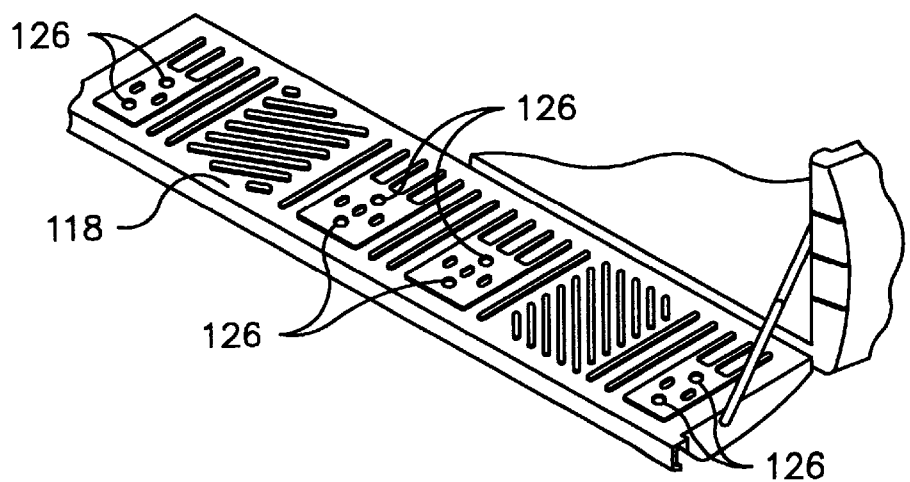
*Fig. 10.1*

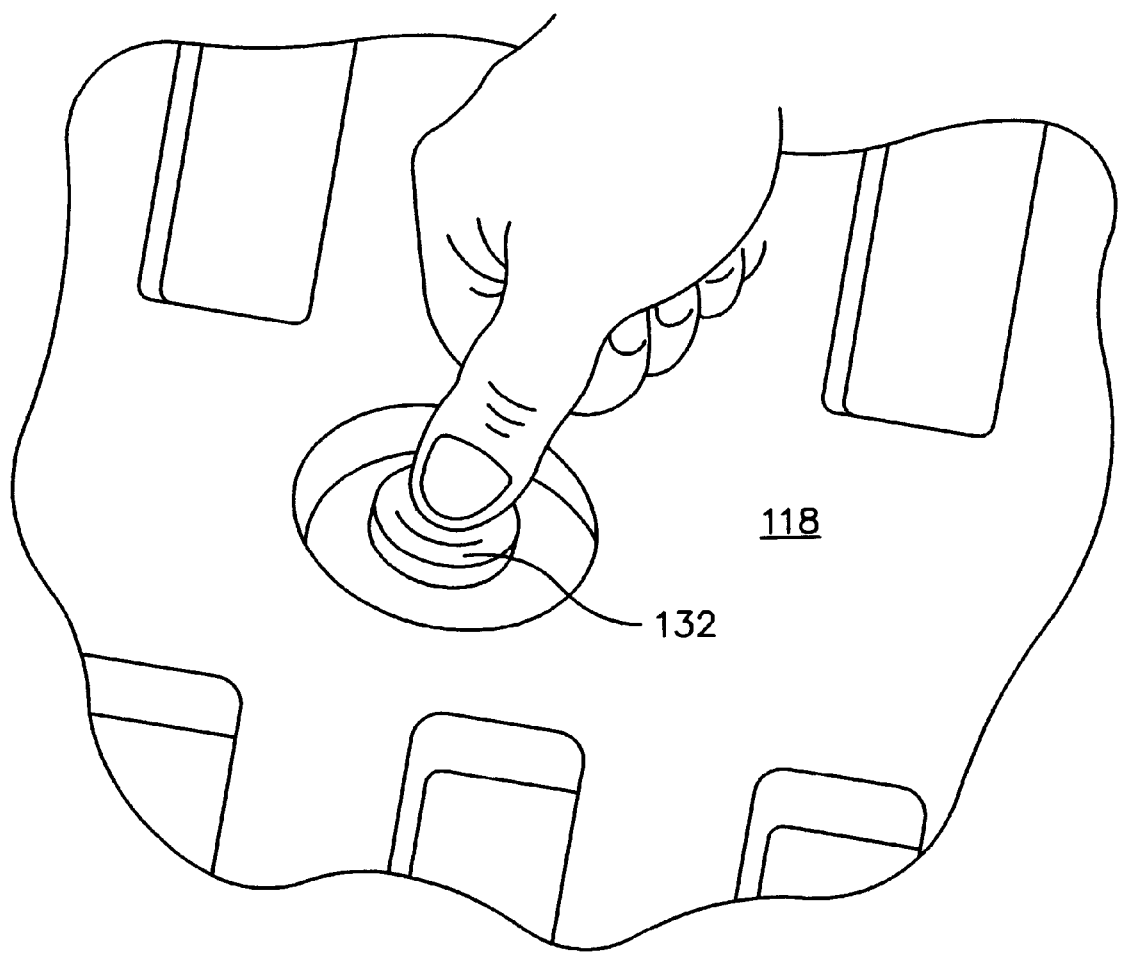
Fig. 11.1

PLASTIC BED LINER RETAINER FOR A PICKUP TRUCK

BACKGROUND OF THE INVENTION

The invention relates to retainers for attached a plastic bed liner to pickup truck beds.

There are two kinds of pick up truck beds sold in the market. One type are those pick up truck beds having an upper bed rail extending outwardly such as those found on 1997 and 1998 model year ISUZA pick up trucks. The other type are those pick up truck beds having an upper bed rail extending inwardly, such as those found on 1996 and 1997 model year TOYOTA, MITSUBISHI, NISSAN, FORD, and MAZADA pick up trucks. Therefore, there are patterns and methods of attaching a plastic bed liner to a pick up truck varying accord to the kind of pick up truck bed.

Methods of attaching a plastic bed liner to the cargo bed of a pick up truck by drilling holes in the cargo bed and fastening the plastic bed liner with screws or bolts are well known. These methods have many drawbacks such as rust forming on the cargo bed and imprecise installation position. Many holes that are drilled in order to fasten the bed liner with screws can cause develop of harmful rust which can spread and damage the truck bed.

SUMMARY OF THE INVENTION

An object of this invention is to provide apparatus used to attach a plastic bed liner to a pick up truck without the necessity of drilling holes through the truck body. The invention has been developed from the idea that the retainer must securely fasten the plastic bed liner to the truck bed. As a result, the strength of the bed liner will be improved. Another object of the invention is to provide a number of tie-down loops for securing a load placed in the bed. Moreover, the invention has been designed so that it does not require any holes to be drilled in the truck bed which create potential rust sites.

The invention includes a plurality of tie-down loops, tie-down loop retaining plates, inner retaining locking members, tailgate toggle members, rubber insulation strips, plastic caps and tie-down loop supplemental members. All are used in bonding the plastic bed liner to a pick up truck bed having an outwardly extending top bed rail without drilling holes into the truck body. Four tie-down loop retaining plates are provided, one each for the front and rear portions of each side wall of the truck bed. Retainers are made from sheet metal or high quality plastic such that they are both strong and durable. According to the preferred embodiment of the invention, rubber insulation strips are adhered to the plastic bed liner for close fitting engagement between the plastic bed liner and the truck body, hence reducing wear of the truck bed. Alternatively, inner retaining locking members are provided to attach the bed liner to a truck bed having an inwardly extending top bed rail. Furthermore, the tie-down loop supplement members are designed to be used to tie down cargo items without drilling the truck body. The above, as well as additional objections, will be better illustrated in the following detailed description, drawings and claims.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings, embodiments which are presently preferred. It should be understood, however, that the invention is not limited to the precise arrangements and instrumentalities shown. In the drawings:

FIG. 4.1 is a perspective view of a tie down supplementary member in accordance with a third preferred embodiment of the present invention;

FIG. 5 is a partial perspective view of the right rear corner of the pickup truck bed and tail gate showing removal of the factory-installed caps in accordance with the first preferred embodiment;

FIG. 5.1 is a more limited partial perspective view as shown in FIG. 5 showing installation of tailgate fasteners through cover holes and into factory-drilled tail gate holes in accordance with the first preferred embodiment;

FIG. 6 is a greatly enlarged, partial cutaway view of the tailgate cover showing installation of the tailgate fasteners and toggle members in accordance with the first preferred embodiment;

FIG. 6.1 is the greatly enlarged, partial cutaway view as shown in FIG. 6, showing installation of the tailgate cover onto the tailgate in accordance with the first preferred embodiment;

FIG. 7 is a partial perspective view of the tailgate cover, showing the installation of a tailgate fastener through the tailgate cover and into the tailgate in accordance with the first preferred embodiment;

FIG. 7.1 is a perspective view as shown in FIG. 7, showing installation of a cap covering the tailgate fastener in accordance with the first preferred embodiment;

FIG. 8.1 is a vertical sectional view of the inwardly-extending pick up truck bed top rail and the corresponding portion of the plastic bed liner showing installation of the inner retaining locking member in accordance with the second preferred embodiment;

FIG. 9 is a partial perspective view of the top left rear portion of the truck bed and plastic bed liner illustrating the of attaching the inner retaining locking member to a truck bed that has inwardly extending top rails in accordance with the second preferred embodiment;

FIG. 9.1 is a vertical sectional view as shown in FIG. 8.1 illustrating engagement of the inner retaining locking member with the under side of the truck bed top rail in accordance with the second preferred embodiment;

FIG. 9.2 is a partial perspective view as shown in FIG. 9, illustrating installation of a cap over the head of a rail fastener in accordance with the second preferred embodiment;

FIG. 9.3 is a fragmentary, perspective view of a plastic cap covering a rail fastener;

FIG. 10 is a partial perspective view of the right rear end portion of the pickup truck bed and the tailgate showing factory-drilled tailgate holes in accordance with the second preferred embodiment;

FIG. 10.1 is a partial perspective view as shown in FIG. 10, illustrating positioning of the tailgate cover in accordance with the second preferred embodiment;

FIG. 11.1 is a partial perspective view as shown in FIG. 11, illustrating installation of a plastic cap over the head of a factory-installed screw.

DETAILED DESCRIPTION OF THE INVENTION

Figure 8:
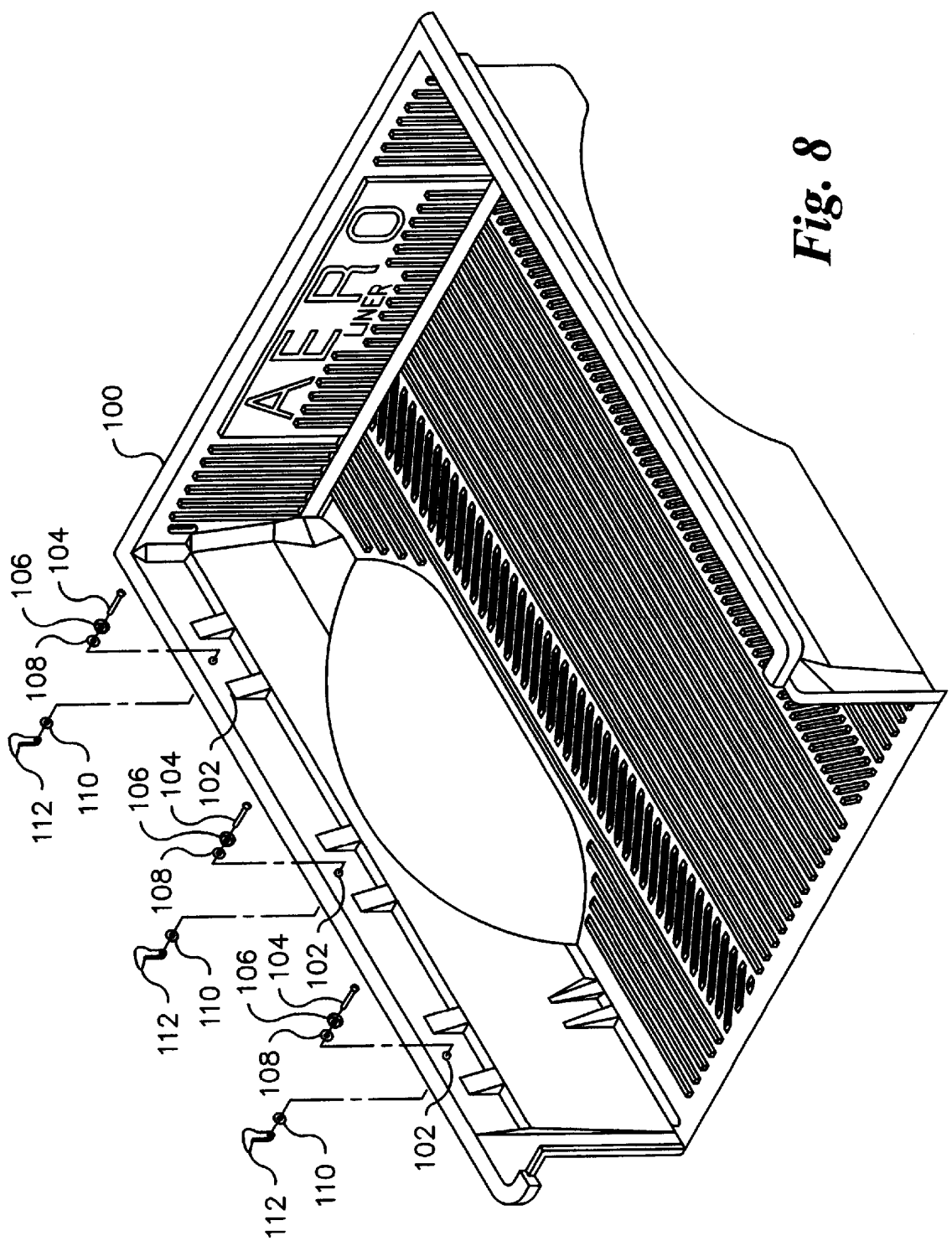
FIG. 8 is a perspective view of a plastic bed liner in accordance with a second preferred embodiment of the plastic bed liner retainer assembly showing the positions for installation of the inner retaining lock members.

The plastic bed liner retainer apparatus shown in FIGS. 1–12 includes apparatus for securely attaching a plastic bed liner 10 (shown in FIG. 1) to a pickup truck bed 12 (shown in FIG. 2c) having either an outwardly-extending top bed rail (not shown) or an inwardly-extending top bed rail 14 (shown in FIG. 8.1).

Tie-down rings 11 are generally provided as factory installed original equipment on pickup trucks, there generally being a plurality of tie-down rings 11 mounted to the interior surface of the pickup truck bed 12. Generally, the tie-down rings 11 are positioned such that there are two on the front side portion of the pickup truck bed 12, and two on the rear side portion of the pickup truck bed 12. The tiedown rings 11 are fastened to the pickup truck bed 12 by a plurality of factory-installed fasteners 24, generally two per tie-down ring 11. The factory-installed fasteners 24 pass through the tie-down rings 11, through factory-drilled bed holes 16, and into internally-threaded members (not shown) mounted to the pickup truck bed 12. Thus, when one removes the factory-installed tie-down rings 11, the factory-drilled bed holes 16 and internally-threaded members remain. To expose additional factory-drilled bed holes for mounting of the plastic bed liner retainer apparatus, it is contemplated that additional factory-installed fasteners (not shown) can be removed, particularly at the front part of the pickup truck bed 12.

Figure 1:
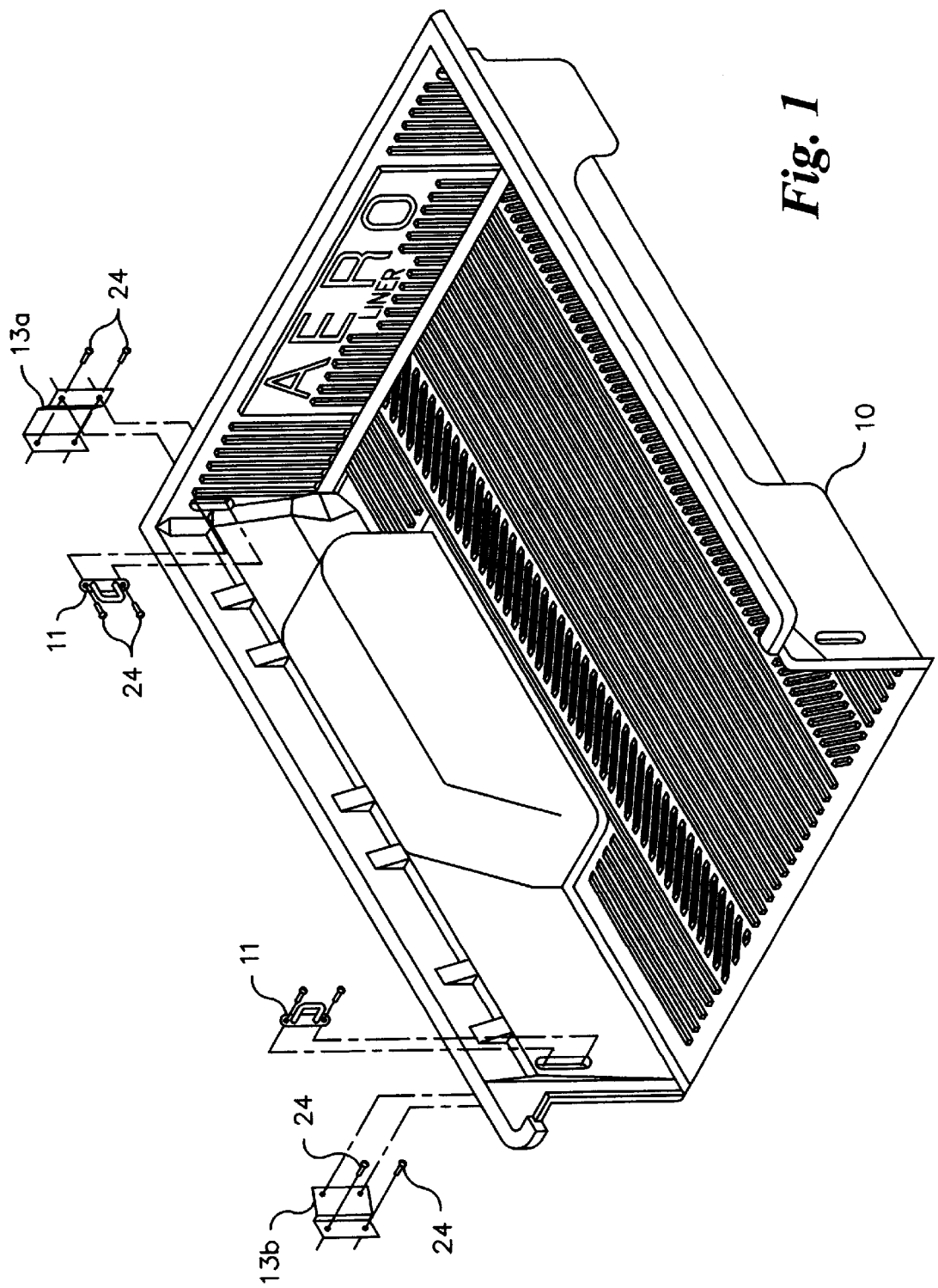
FIG. 1 is an isometric view of a bed liner in accordance with a first preferred embodiment of the plastic bed liner retainer assembly showing the left side front and rear positions for attaching the tie-down retaining plates to a pick up truck bed having the upper bed rail extending outwardly.
Figure 2A:
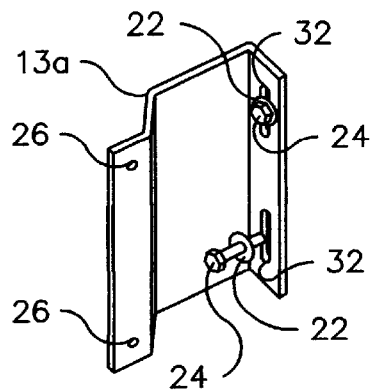
FIG. 2a is a perspective view of a front tie-down retaining plate in accordance with the plastic bed liner retainer assembly of the first preferred embodiment.
Figure 2B:
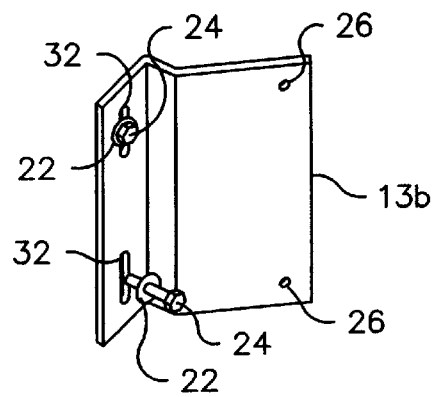
FIG. 2b is a perspective view of a rear tie-down retaining plate in accordance with the plastic bed liner retainer assembly of the first preferred embodiment.
Figure 2C:
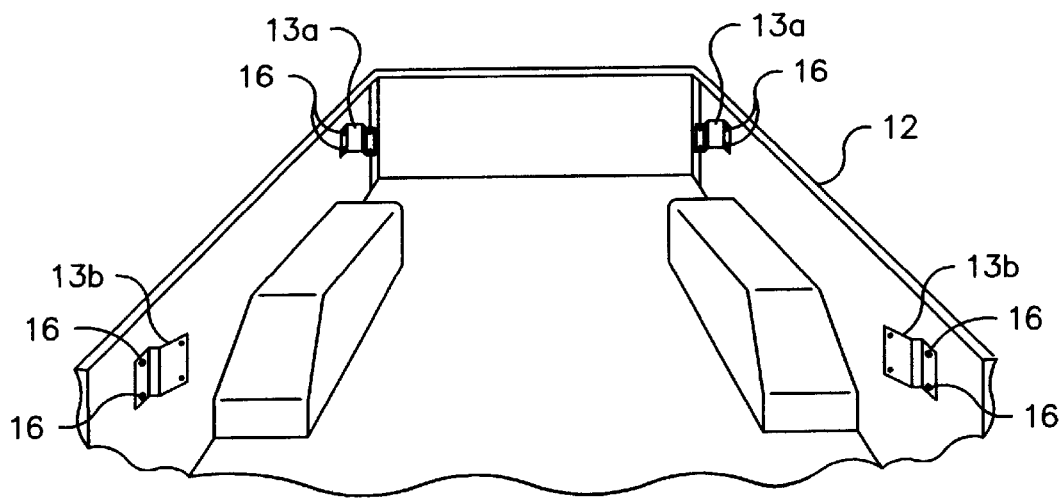
FIG. 2c is a perspective view of a pick up truck bed showing the tie-down retaining plates installed in the pickup truck bed in accordance with the first preferred embodiment.

In a first preferred embodiment, wherein the plastic bed liner 10 is to be installed in a pickup truck having an outwardly extending top bed rail, and as best shown in FIGS. 1 and 2c, a plurality of front and rear tie-down ring retaining plates 13a, 13b work in conjunction with the factory-drilled bed holes 16 to secure the bed liner 10 to the pickup truck bed 12. As best shown in FIG. 2c, after having removed the tiedown rings 11, the front and rear retaining plates 13a, 13b are attached to the inside surface of the pickup truck bed 12 with the factory-installed fasteners 24, passing through washers 22, holes 32 in the retaining plates 13a, 13b, through the factorydrilled bed holes 16, and into factory-installed internally-threaded members. Preferably, the pair of front retaining plates 13a are installed at each front side portion of the truck bed 12 and a pair of rear retaining plates 13b are installed at each rear side portion of the truck bed 12. The retaining plates 13a, 13b are preferably made from galvanized iron or tough and durable plastic.

Figure 3:
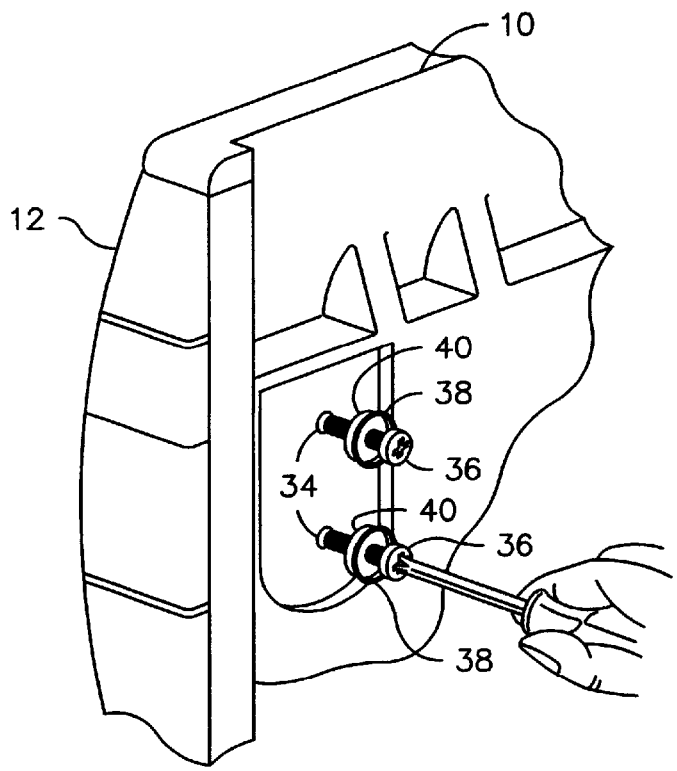
FIG. 3 is a partial perspective view of the left rear end of the truck bed and plastic bed liner showing the first fasteners being installed into the left rear tie-down retaining plate through the plastic liner in accordance with the first preferred embodiment.
Figure 4:
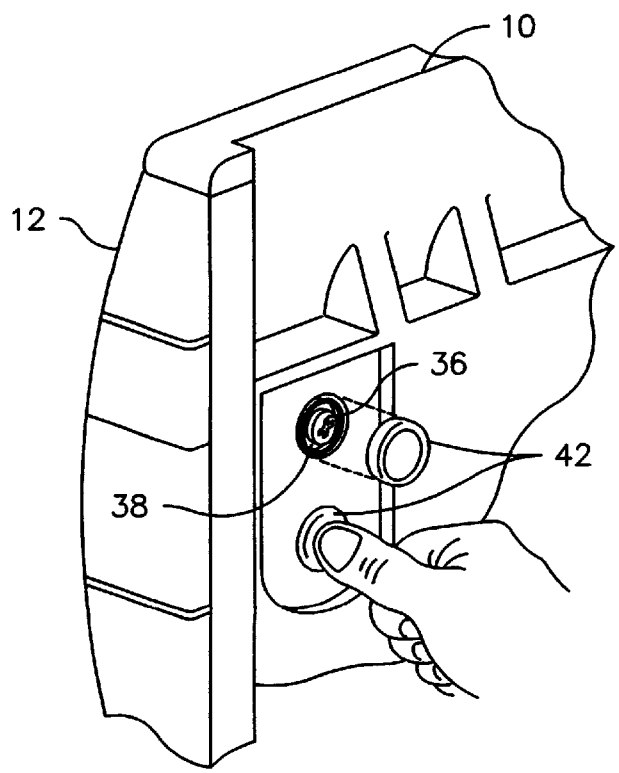
FIG. 4 is a partial perspective as shown in FIG. 3 showing caps being installed to cover the first fasteners of the left rear tie-down retaining plate in accordance with the first preferred embodiment.

After installation of the retaining plates 13a, 13b, the plastic bed liner 10 is placed into the pickup truck bed 12. The plastic bed liner 10 includes a plurality of liner holes 34 (see FIG. 3) that align with a plurality of retaining plate holes 26 such that no new holes need be drilled, obviating the risk that corrosion will occur as a result of such newly drilled holes. Referring now to FIGS. 1 and 3, after aligning the liner holes 34 with the retaining plate holes 26, a plurality of first fasteners 36 are installed through the liner holes 34 and into the retainer plate holes 26, preferably using cup washers 38 and space washers 40, as shown in FIG. 3, between the head of each first fastener 36 and the plastic bed liner 10. As shown in FIG. 4, a plastic cap 42 is then installed over the head of each first fastener 36 and into engagement with each cup washer 38. It will be recognized by those of ordinary skill in the art that the plastic cap 42 is well known in the art and is configured to engage a cup washer 38.

The description of the first preferred embodiment will now turn to mounting the tail gate cover 44 of the plastic bed liner 10 to the tail gate 46 of the pickup truck bed 12 having an outwardly extending top bed rail. Referring now to FIG. 5, there is shown a plurality of factory-installed caps 48 which cover factory-installed rivets (not shown). The rivets are fitted into factory-drilled tailgate holes 50 in the interior surface of the tail gate 46. Prior to installing the tail gate cover 44, the rivets must be carefully drilled out by one of several methods well known to those of ordinary skill in the art. It is preferred that a drill bit diameter of 4 millimeters be used for the drilling process. It should be noted that in removing the rivets, one should use care not to drill into the factory painted surface, otherwise corrosion may result from exposure of the metal to the elements.

Referring to FIG. 5.1, the tail gate cover 44 includes cover holes 52 that are configured to align with the factory-drilled tailgate holes 50 on the tail gate 46. Having removed the rivets, the tail gate cover 44 is then prepared for installation on the tail gate 46. As shown in FIG. 5.1, a tail gate fastener 54 having a cup washer 56 and a space washer 58 adjacent to the head of the tail gate fastener 54 is inserted through each cover hole 52 in the tail gate cover 44 from the interior side of the tail gate cover 44. As shown in FIG. 6, prior to positioning the tail gate cover 44 onto the tail gate 46, a toggle member 60 is positioned on each tail gate fastener 54 so as to leave room on the tail gate fasteners 54 such that the toggle members 60 can toggle to a closed position (not shown) for installation through the factory-drilled tailgate holes 50. Preferably the toggle members 60 are made from galvanized iron or tough and durable plastic material.

Referring now to FIG. 6.1, the tail gate cover 44 is positioned adjacent to the inner surface of the tail gate 46 such that the toggle members 60 are aligned with the factory-drilled tail gate holes 50. The toggle members 60 are then toggled, i.e., compressed, and passed through the factory-drilled tail gate holes 50, and once through the tail gate holes 50 they are permitted to expand, thereby engaging the tail gate 46. The tail gate fasteners 54 are then tightened as shown in FIG. 7 to draw the tail gate cover 44 into secure engagement with the tail gate 46. Referring to FIG. 7.1, a cap 62 is pressed onto the cup washer 56 accompanying each tail gate fastener 54 such that the caps 62 engage the cup washers 56.

Referring now to FIGS. 8–11.1, there is shown a second preferred embodiment of the plastic bed liner retainer assembly which is configured to attach to truck beds having an inwardly extending top bed rail 14, shown in FIGS. 8.1 and 9.1. As shown in FIG. 8, the plastic bed liner 100 includes a plurality of liner holes 102 located along the upper side of the plastic bed liner 100. These liner holes 102 are positioned at a height below that of the top bed rail 14 for purposes that will become apparent in the foregoing description. A rail fastener 104 having a cup washer 106 immediately adjacent to its head and a space washer 108 immediately adjacent to the cup washer 106 is passed from the interior side of the plastic bed liner 100 through each of the liner holes 102. Preferably the rail fasteners 104 are of the size M8×30. As best shown in FIG. 8.1, a flat washer 110 and an inner retaining locking member 112 having an eccentric hand 114 are positioned on each rail fastener 104 on the external side of the plastic bed liner 100, the flat washer 110 being adjacent to the plastic bed liner 100. Preferably the inner retaining locking members 112 are made from galvanized iron or tough and durable plastic material and the rail fasteners 104 and inner retaining locking members 112 have complementary machine threads. The inner retaining locking members 112 are preferably turned onto the rail fasteners 104 about 3–4 revolutions so as to ensure that it will remain on the rail fasteners 104.

The plastic bed liner 100 is then positioned on the truck bed 12. The rail fasteners 104 are then tightened as shown in FIG. 9 so that the eccentric hand 114 of each inner retaining locking member 112 will be rotated into contact with the underside of the top bed rail 14 as shown in FIG. 9.1, thus preventing further rotation of the inner retaining locking members 112. It will be understood from reading this disclosure that the eccentric arm 114 of each inner retaining locking member 112 is sufficiently long such that the eccentric arm 114 will rotate into engagement with the under-side of the top bed rail 14 and that the inner retaining locking member 112 will not further rotate upon further tightening of the rail fasteners 104. As shown in FIG. 9.2, a plastic cap 116 is placed over each rail fastener 104 into engagement with the cup washers 106, resulting in the covered configuration shown in FIG. 9.3.

Figure 11:
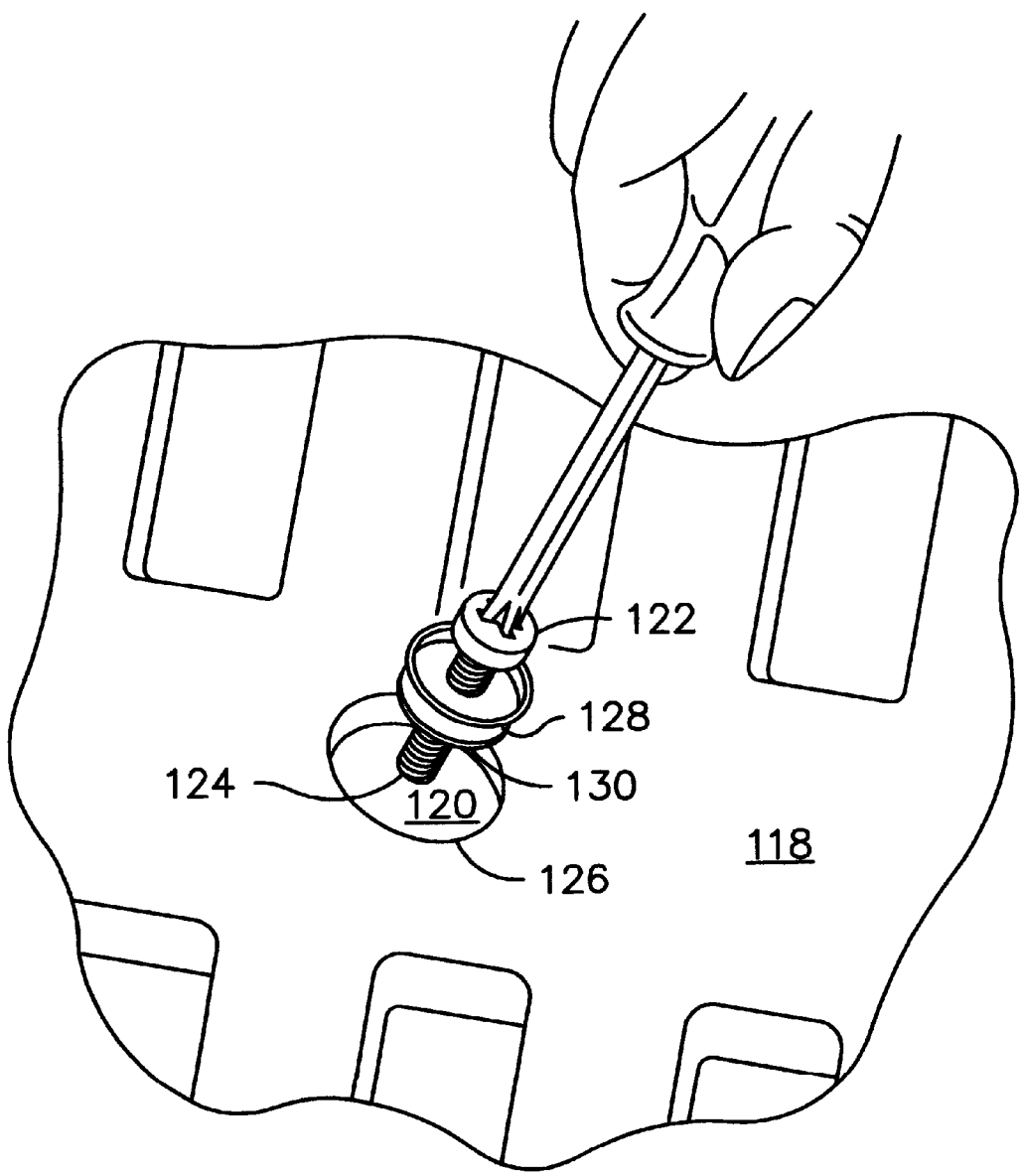
FIG. 11 is a partial perspective view the tailgate cover illustrating installation of factory-installed screws to retain the tailgate cover in accordance with the second preferred embodiment.

To attach a tail gate cover 118 of the plastic bed liner 100 to a tail gate 120 having an inwardly extending top bed rail (not shown), the factory-installed screws 122 on the inwardly-facing surface of the tail gate 120 must be removed as shown in FIG. 10, exposing factory-drilled tail gate holes 124. The tail gate cover 118 is provided with cover holes 126 that are positioned to align with the factory-drilled tail gate holes 124. As shown in FIG. 10.1, the tail gate cover 118 is positioned on the tail gate 120 and the factory-installed screws 122 which had been removed from the tail gate 120 are then reinstalled through the cover holes 126 into the factory-drilled tail gate holes 124 as shown in FIG. 11. A cup washer 128 is positioned on each factory-installed screw 122 adjacent to the head and a space washer 130 is positioned on each factoryinstalled screw 122 between the cup washer 128 and the tail gate cover 118. A cap 132 is installed over the head of each factory-installed screw 122, engaging with the cup washers 128 as shown in FIG. 11.1.

Figure 12:
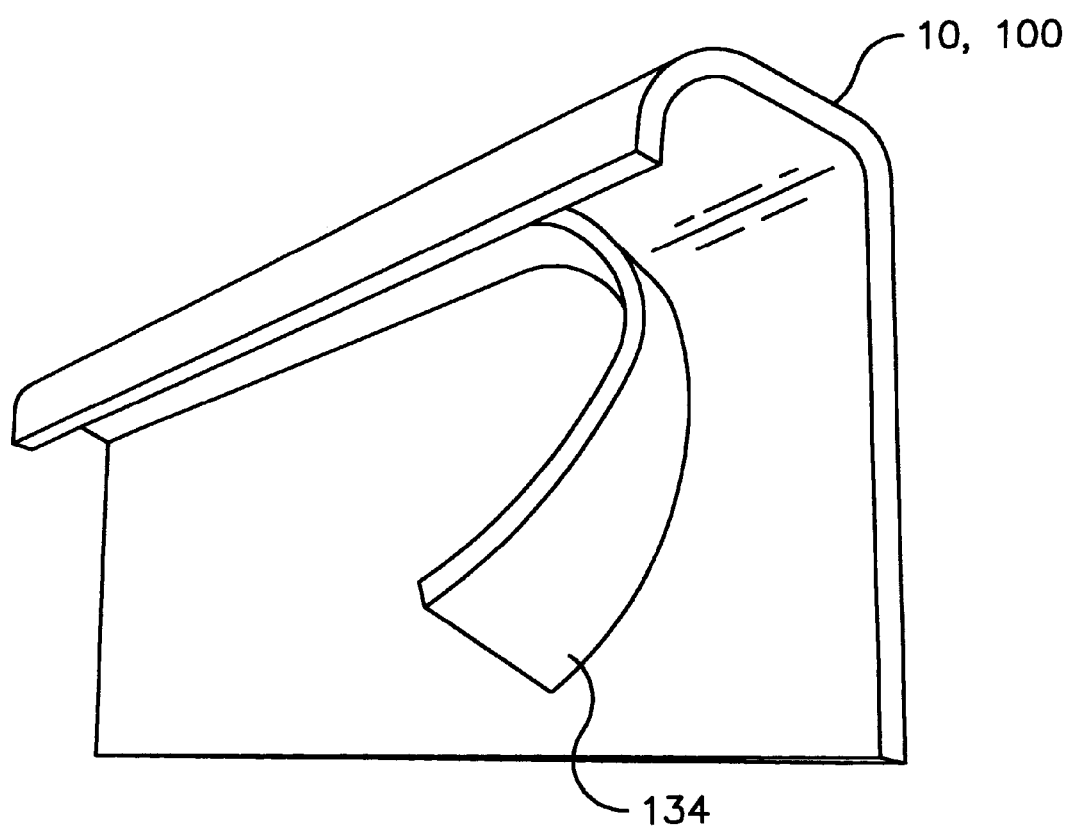
FIG. 12 is a partial perspective view of the bed rail portion of a plastic bed liner showing installation of a rubber insulating strip in accordance with the first, second, and third preferred embodiments.

Importantly, the pickup truck bed 12 should be cleaned prior to installation of the plastic bed liner 10, 100 into the truck bed 12 and the tail gate 46, 120 should be cleaned prior to installation of the tail gate cover 44, 118. The elimination of contaminants from the interface between the truck bed 12 and tail gate 46, 120 and the plastic bed liner 10, 100 and tail gate cover 44, 118, respectively, will reduce wear and hence the potential for corrosion of the truck bed 12 and tail gate 46, 120. To further reduce wear between the plastic bed liner 10, 100 and the truck bed 12 and between the tail gate cover 44, 118 and tail gate top rail 14, rubber insulation strips 134 preferably are installed at the interface between these components, as shown in FIG. 12.

In a third preferred embodiment, the tie-down rings 13*a*, 13*b* may be replaced by tie-down ring supplemental members 213 shown in FIG. 4.1. The tie-down ring supplemental members 213 include a fold-down ring 214 such that when it is desired to tie down a load in the cargo bed, the fold-down ring 214 is merely configured to a usable orientation with respect to the base member 215 and includes a tie-down hole 216 through which cargo is attached. When not in use, the fold down ring 214 is folded down adjacent to the base member 215.

The procedures of installation disclosed above can be used with most pickup trucks sold in the market without the need to drill the truck bed, thus eliminating the risk of rust developing as a result of such drilling.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A retainer apparatus for securing a bed liner to a pickup truck bed, the pickup truck bed having a plurality of bed holes and the bed liner having a plurality of liner holes, the retainer apparatus including:

a front tie-down ring retaining plate for positioning between the pickup truck bed and the liner, the front tie-down ring retaining plate having a first end and an opposing second end, the first end having at least one first hole therethrough for alignment with a first bed hole, the first end being secured to the first bed hole, the second end having at least one second hole therethrough for alignment with a first liner hole, the second end being secured to the first liner hole; and a rear tie-down ring retaining plate for positioning between the pickup truck bed and the bed liner, the rear tie-down ring retaining plate having a first end and an opposing second end, the first end of the rear tie-down ring having at least one first hole therethrough for alignment with a second bed hole, the first end of the rear tie-down ring being secured to the second bed hole, the second end of the rear tie-down ring having at least one second hole therethrough for alignment with a second liner hole, the second end of the rear tie-down ring being secured to the second liner hole.

2. The retainer apparatus of claim 1 further comprising tie-down rings attached to the bed liner in alignment with the front and rear tie down ring retaining plates.

3. The retainer apparatus of claim 2 wherein the tie-down rings are supplied as original equipment with the pickup truck bed.

4. The retainer apparatus of claim 1 wherein the pickup truck bed has a tail gate, the tail gate having an inner face and a plurality of tail gate holes through the inner face, the bed liner having a tail gate cover, the tail gate cover having a plurality of cover holes therethrough corresponding in position with the tail gate holes, the retainer apparatus further comprising:

a plurality of tail gate fasteners for simultaneous positioning in at least some of the cover holes and tail gate holes; and a plurality of toggle members, one positioned on each tail gate fastener, for engaging an inner surface of the inner face of the tail gate.

5. The retainer apparatus of claim 4 further comprising a space washer positioned on each tail gate fastener adjacent to the tailgate cover, a cup washer positioned between the space washer and a head of each tail gate fastener, and a cap engaging each cup washer and covering the head of each tail gate fastener.

6. A retainer apparatus for securing a bed liner to a pickup truck bed, the pickup truck bed having a plurality of bed holes and the bed liner having a plurality of liner holes, the retainer apparatus including:

a front tie-down ring retaining plate for positioning between the pickup truck bed and the bed liner, the front tie-down ring retaining plate having a first end and an opposing second end, the first end having at least one hole therethrough for alignment with a first bed hole, the first end being secured to the first bed hole, the second end having at least one hole therethrough for alignment with a first liner hole, the second end being secured to the first liner hole; and a rear tie-down ring retaining plate for positioning between the pickup truck bed and the bed liner, the rear tie-down ring retaining plate having a first end and an opposing second end, the first end of the rear tie-down ring having at least one hole therethrough for alignment with a second bed hole, the first end of the rear tie-down ring being secured to the second bed hole, the second end of the rear tie-down ring having at least one hole therethrough for alignment with a second liner hole, the second end of the rear tie-down ring being secured to the second liner hole;

tie-down rinds attached to the bed liner in alignment with the front and rear tie down ring retaining plates wherein the tie-down rings are tie-down ring supplemental members, the tie-down ring supplemental members having a base member with a plurality of holes therethrough for alignment with the least at one of the plurality of liner holes, and a fold down ring which is pivotably attached to the base member and which has a tie-down hole therethrough.

7. The retainer apparatus of claim 6 wherein the bed liner is secured to the second ends of the front and rear tie-down ring retaining plates by a plurality of first fasteners, each of the fasteners including a cup washer adjacent to a head of the first fastener and a space washer positioned between the cup washer and the bed liner, and a cap engaging the cup washer and covering the head of the fastener.

* * * * *